United States Patent

[11] 3,581,796

| [72] | Inventor | Erhard J. Alm<br>415 Heath Street East, Toronto 17,<br>Ontario, Canada |
|---|---|---|
| [21] | Appl. No. | 772,124 |
| [22] | Filed | Oct. 31, 1968 |
| [45] | Patented | June 1, 1971 |

[54] TIRE CHANGER
9 Claims, 5 Drawing Figs.

[52] U.S. Cl. .................................................. 157/1.28
[51] Int. Cl. .................................................. B60c 25/06
[50] Field of Search .......................................... 157/1.22,
1.24, 1.26, 1.28

[56] References Cited
UNITED STATES PATENTS
| 3,008,512 | 11/1961 | Foster ........................... | 157/1.28 |
| 3,032,094 | 5/1962 | Bishman ........................ | 157/1.28 |
| 3,032,095 | 5/1962 | Brosene, Jr. et al. ............ | 157/1.28UX |
| 3,064,718 | 11/1962 | Brosene, Jr. ................... | 157/1.28 |

*Primary Examiner*—Granville Y. Custer, Jr.
*Attorney*—Douglas S. Johnson

ABSTRACT: A tire changer is described with particular reference to the bead breaker portion thereof. The bead breaker comprises two bead breaker jaws which are axially opposed and which may be operated singly or in combination. The thrust developed in the machine is directed proportionately to each of the bead breakers with respect to the resistance which the bead breaker encounters; thus each bead breaker operating singly exerts substantially the entire thrust developed in the machine.

INVENTOR.
ERHARD J. ALM
BY Douglas S. Johnson
Attorney

PATENTED JUN 1 1971

INVENTOR.
ERHARD J. ALM

BY
Douglas S. Johnson
Attorney

PATENTED JUN 1 1971

INVENTOR.
ERHARD J. ALM

BY Douglas S. Johnson

Attorney 3,581,796

TIRE CHANGER

BACKGROUND OF THE INVENTION

This invention relates to a tire mounting and demounting machine, and more particularly the invention relates to the tire bead breaker portion of tire mounting and demounting machine. The machine contemplated by this invention is particularly useful with respect to automotive tires, nd may be found the most frequently in service stations and service areas of tire dealers and automobile dealers. The machine contemplated by his invention when in use breaks the bead on a tire to be demounted from the rim of a wheel as well as demounting and mounting the tire on the rim and is known in the automotive trade as a tire changer."

In many circumstances, the seal or bead formed between the edge of a tire and the inner edge of a wheel rim may be very difficult to break, and considerable force nd pressure against the bead may be required. The bead breaker contemplated by this invention is an axially compressing bead breaker, wherein the jaws of the bead breaker are opposed one to the other on opposite sides of the tire and move in a substantially reciprocal manner into the tire. However, it is a feature of this invention that where the thrust applied against the opposite sides of the tire by the bead breaking jaws is insufficient to break the bead of the tire, either of the jaws may be used singly to exert pressure against the bead of the tire, and the pressure so exerted is substantially double that against the bead when both jaws are used simultaneously. That is to say, he bead breaker of this invention has a thrust transfer feature whereby the thrust exerted against the bead of a tire remains substantially constant whether through both jaws or either of the jaws singly.

It has been found that thrust in the order of 2500 against the bead of tire is generally sufficient to break the bead. However, in many circumstances it has been found that such a thrust is not sufficient to break the bead of the tire, and indeed a thrust of 4500 or even 8000 pounds may sometimes be required to break the bead. It has also been found that it is most convenient and efficient in the operation of a tire changer if the operator can remain substantially stationary in a position adjacent the machine and control all of the functions of the machine from that position. It is desirable that the machine which the operator is controlling be simple in its operation and that it be such that even a relatively unskilled operator can recognize that the operation of both bead breaking jaws together may be incapable of breaking the beads on the tire and can then easily and quickly change the operation of the machine so that only one bead of the tire is acted upon be either of the bead breaking jaws as the operator may decide.

It is also desirable to have sufficient flexibility in the machine so that it may readily accommodate tires and wheels of different sizes. In the automotive trade, wheel rims may vary from 11 to 15 inches (plus or minus) in diameter, and tire widths may vary from 4 to greater than 8 inches (plus or minus). A machine which can accommodate a range of tire sizes as expressed above will be he most efficient to its owner and/or operator, and will provide he greatest return from its use.

It also is desirable that a tire changer machine have a smooth operation, thereby reducing shock nd fatigue to the equipment as well as reducing the risk of accident to the operator or other standers-by. Having regard to the availability of compressed air in service areas wherein the tire changer machine is to be used, it is desirable that the machine may be operable from a source of compressed air.

SUMMARY OF THE INVENTION

It is an object of this invention to provide a bead breaker in which the bead breaking jaws are opposed and operate in axial compression towards one another, and in which the total thrust exerted by the machine is substantially constant whether both bead breaking jaws are used together or either of them is used singly.

It is a further object of this invention to provide a tire changer having a bead breaker as expressed above, and which can accommodate a wide range of tire and wheel sizes and which can be operated from substantially one single position by the operator.

A still further object of his invention is to provide tire changer which is simple nd positive in its operation, having a smooth operation and which is operable from a source of compressed air.

BRIEF DESCRIPTION OF THE DRAWING

These and other objects and features of the present invention may be more readily ascertained by reference to the following description and the drawings, in which.

DESCRIPTION OF THE PREFERRED EMBODIMENT

Figure 1:
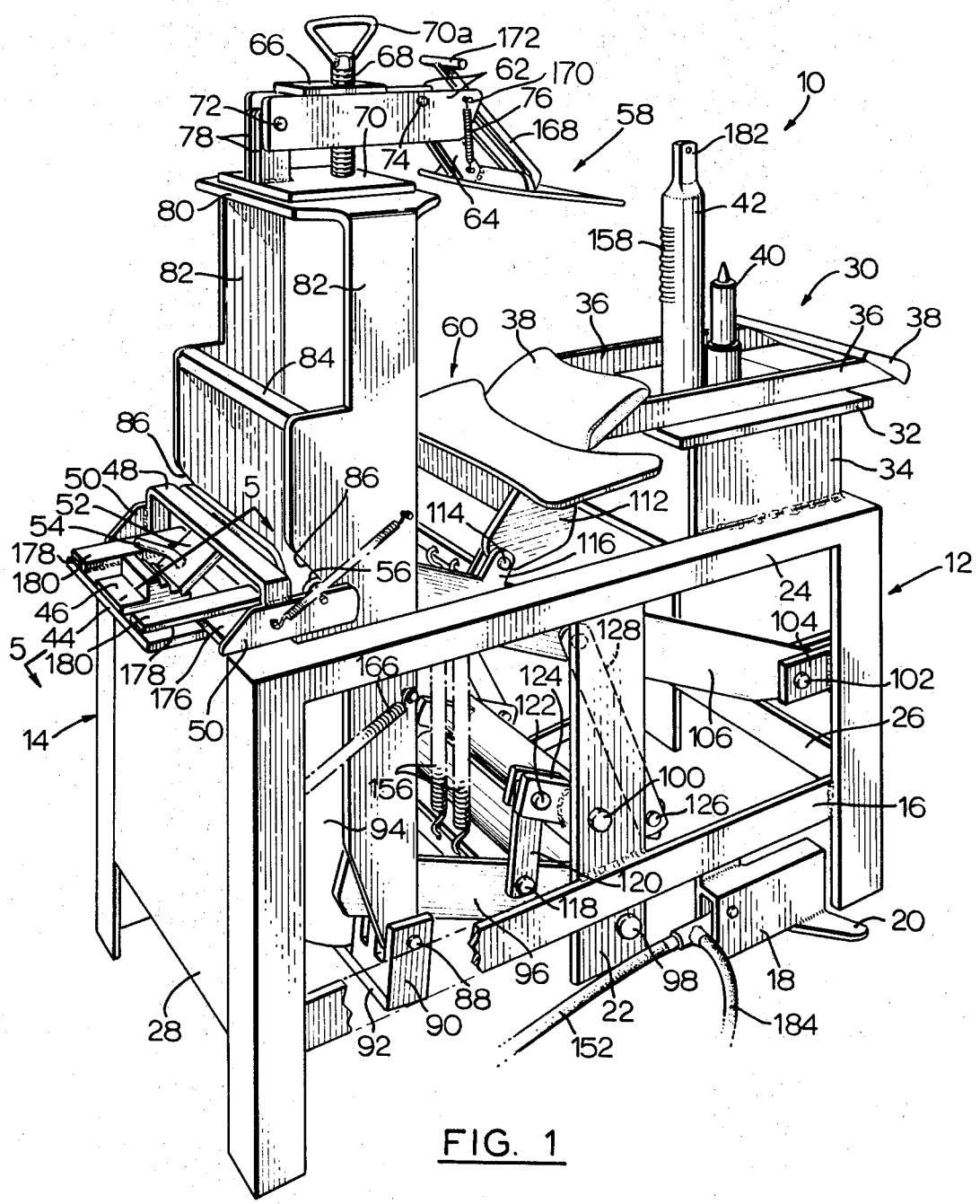
FIG. 1 is perspective view of the tire changer according to the present invention.

The tire changer is shown at 10, and comprises side frame members 12 and 14 which may be welded or bolted. On one side of the frame, as shown, there is a lower crossmember 16 between the two legs of the frame member 12, and attached to it is a pedal operated air valve 18 having pedal 20. On the same side of the machine as crossmember 16 there is a vertical member 22 more or less in the center of frame member 12 and which is fixedly attached to the crossmember 16 and the top member 24 of the frame member 12. Additional bracing members such as crossmember 26 assure the rigidity of the frame; and the frame portion of the machine when completely assembled may conveniently be closed in with sheet metal panels such as is shown at 28.

Between the upper frame members 24 and one end thereof there is fixedly attached a wheel support 30; comprising a plate 32 supported by side members 34 and having arms 36 with wheel shoes 38 across the ends thereof above the plate 32. Extending vertically above the arms 36 and shoes 38, and centrally located among them, there is lug pin 40 and a rotatable center post 42.

At the opposite end of the frame to wheel support 30 there is a plate 44 on which is attached a stepped base piece 46. The stepped base piece 46 may have from three to six steps extending downwardly towards the center of the tire changer 10 in a manner similar to that shown in FIG. 1. A crossmember 48 is attached to side plates 50, and a step engaging member 52 having handle 54 is fixed to crossmember 48 so as to cooperate with stepped base piece 46 as will appear more evident hereinafter. Cam wheels 56, whose purpose also will appear more evident hereinafter, are attached inwardly of each of side pieces 50 near the ends thereof remote from the stepped base piece 46.

The top bead breaker jaw is shown generally at 58, and the lower bead breaker jaw is shown generally at 60. The top jaw 58 depends downwardly and towards the wheel support 30 from a pair of arms 62 and is connected thereto by arms 64 swingably fitted within arms 62. Across a part of arms 62 is a plate 66 through which bolt 68 extends and threadably engages with plate 70. The upper end of bolt 68 is rotatable within plate 66, and may be turned by such means as handle 70a so as to pivot arms 62 about pin 72. The vertical adjustment of arm 62 about pin 72 above 70 is such as to permit a vertical adjustment of bead breaker jaw 58, thereby accommodating various widths of tires that may be placed on the machine, as will appear more evident hereinafter. Arms 64 are pivotable around pin 74 between arms 62, and the pivotability of arm 64 about pin 74 is restrained by spring 76 fitted to the lower end of arm 64 and to the outer end of arm 62.

Pin 72 also passes through a pair of arms 78 which extend upwardly from plate 70; and plate 70 is fixedly attached to a crossmember 80 between arms 82. Brace member 84 is also fixed between arms 2. On the rear edge of arms 82 is a cam face 86 which cooperates with cam wheels 56 as is explained in greater detail hereafter. The bottom ends of arms 82 are pivotable about pins 88 which extend through bracket 90. The bracket 90 is fixed to a crossarm 92.

Figure 2:
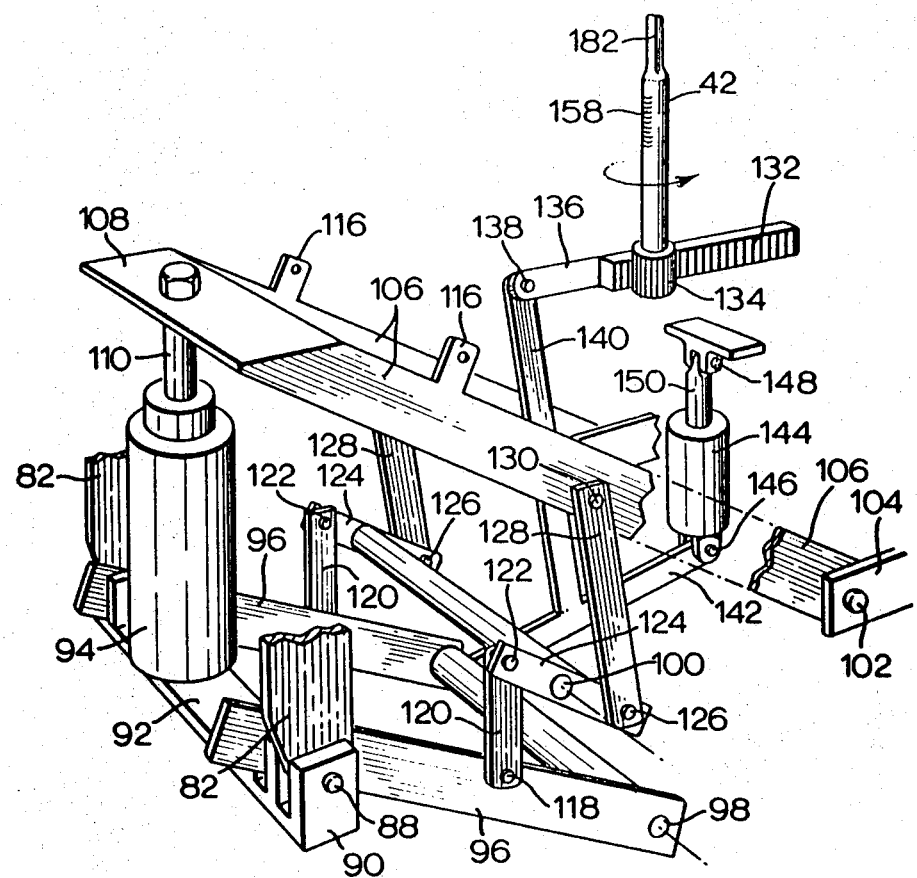
FIG. 2 is a cutaway perspective view of the thrust portion of the machine.
Figure 5:
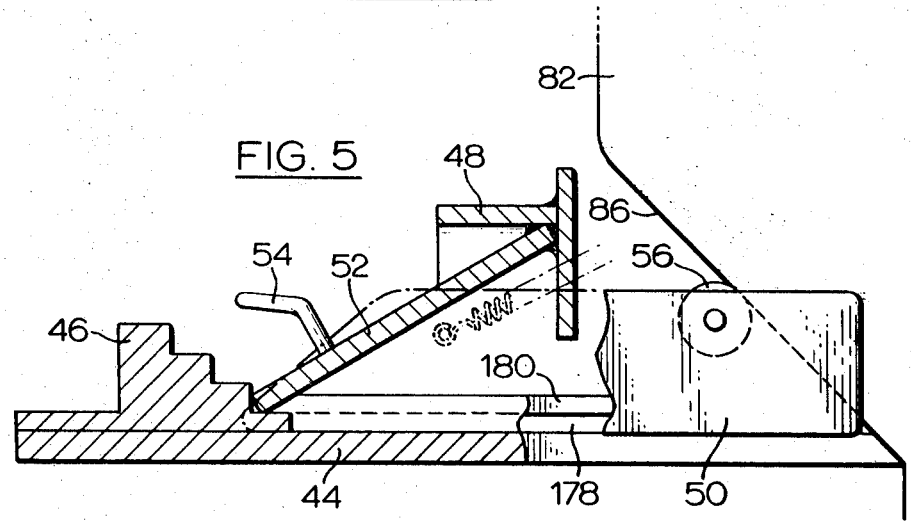
FIG. 5 is a cross-sectional view along line 5–5 in FIG. 1.

Also fixed to the crossarm 92 as shown more clearly in FIG. 2, is the bottom end of an air cylinder 94 which provides an extensible motive power source for the machine. Fixed through the bracket 90 and pivotable about pin 88 is a pair of arms 96, one on each side of air cylinder 94. The end of each arm 96 opposite pin 88 is pivotable about pin 98 which extends through each arm 96 and through the vertical side frame members 22. The pin 98 is fixed pin, in that its position of reference is determined with respect to the frame of the tire changer, and the pin 98 does not change its reference with respect to the frame during operation of the machine as will appear more evident hereinafter.

Two other pins 100 and 102 also remain fixed with reference to the frame of the machine. Pin 100 extends through vertical frame member 22 above and to the rear of pin 98; and pin 102 extends through arms 104 which are fixedly attached to the front leg members of each of the side frame members of the machine.

Extending rearwardly and upwardly from pins 102 is a pair of arms 106 which have a cross brace member 108 between them at the ends of arms 106 remote from pins 102, as can be clearly seen in FIG. 2. Cross brace 108 is fixedly attached to the end of a piston rod 110 which extends from the end of air cylinder 94 opposite the base member 92 to which the cylinder 94 is fixed. As will appear more evident hereinafter, an upward extension of the piston rod 110 from cylinder 94 upon initiation of the operation of the machine by the operator will cause arms 106 to pivot about pins 102, and causes a linear increase in the spacing between cross members 108 and 92.

The lower bead breaker jaw 60 is mounted above a pair of camming arms 112 whose function is described in detail hereafter, and which are pivotably mounted over pins 114 which extend through ears 116 on the upper edges of each of arms 106.

Fixed in each of arms 96 are pins 118 from which connecting arms 120 extend upwardly. At the opposite end of connecting arms 120 from pins 118 are pins 122 which extend through arms 120 and also through arms 124. The arms 124 are, in turn, pivotably mounted on pins 100, and carry pins 126 on the opposite ends of the arms from pins 122, with pins 100 interposed therebetween. Extending generally upwardly from pins 126 are connecting arms 128, which are pivotably mounted at pins 130 to arms 106. Thus, arms 82 are pivotably mounted on pins 88; arms 96 are pivotably mounted on pins 98 and 88 and carry pins 118; arms 106 are pivotably mounted on pins 102 and carry pins 114 and pins 130; arms 120 are pivotably connected between pins 118 and 122; arms 124 are pivotably mounted on pins 100 and carry pins 122 and 126; and arms 128 are pivotably connected between 126 and 130.

A rack ear 132 is slidably mounted within the wall members 34 of wheel mount 30, and is so mounted so as to permit horizontal reciprocating movement of the rack gear. A pinion 134 is mounted at the bottom end of he rotatable center post 42 and is in gear-engaging arrangement with rack gear 132. Extending from rack gear 132 is arm 136 through which there extends a pin 138. Arm 140 is pivotably mounted at pin 138 and extends downwardly to an arm 142. Arm 142 is linked with arms 96, and bears a fixed angular relationship thereto so that upon pivoting of arms 96 about pins 98, arm 142 also pivots about pins 98 in the same rotational direction. The arm 140 is fixed to arm 142 without pivotable capability. At the end of arm 142 opposite pin 98, a restrictor cylinder 144 is pivotably mounted on pin 146. The upper end of the restrictor cylinder 144 is pivotably mounted at pin 148 which is fixed with reference to the frame of the machine. A piston arm 150 extends from the upper end of restrictor cylinder 144.

Figure 3:
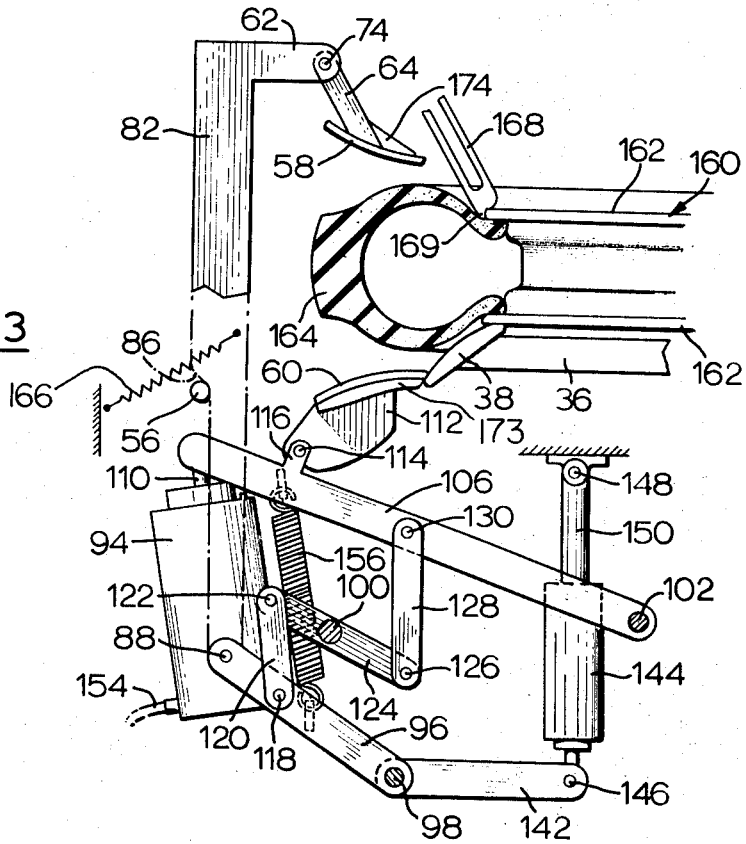
FIG. 3 is a side view, partly schematic of the bead breaker portion of the machine in its rest position before operation.
Figure 4:
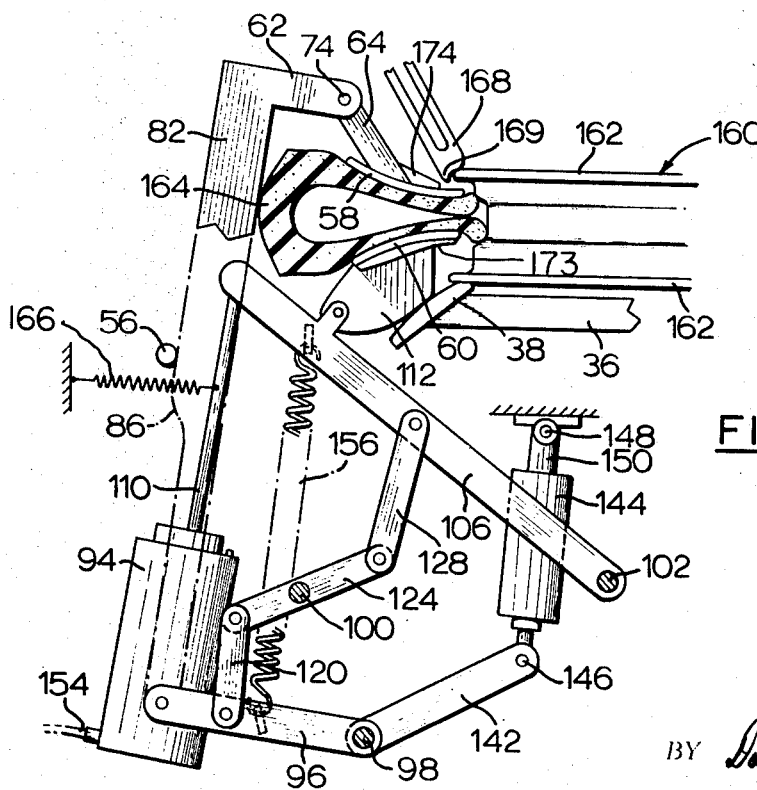
FIG. 4 is view similar to FIG. 3 but showing the bead breaker at the completion of its operation.

The basic operation of the bead breaker is schematically illustrated in FIGS. 3 and 4. Having regard to those figures, but not to the exclusion of FIGS. 1 and 2, the general operation of the bead breaker is as follows.

Air being supplied to the machine through inlet hose 152 is fed through supply hose 154 to air cylinder 94 upon the opening of valve 18 by the operator by depressing pedal 20. The valve 18 is so arranged that air pressure is supplied to the cylinder 94 only upon continued depression of the pedal 20. Upon release of pedal 20, air pressure is relieved and air in cylinder 94 is quickly exhausted. In any event, upon introduction of air pressure to cylinder 94, the piston rod 110 begins to move upwardly from within the cylinder 94. Upward movement of the piston 110 causes the arms 106 to pivot in a clockwise direction as viewed in the drawings about pins 102. Since pins 102 are fixed, a rotational motion of arms 106 is achieved. As arms 106 move upwards, pins 130 also move upwards and pull connecting arms 128. Arms 128, in moving with pins 130, pivot about the pin, and pull upwardly at pins 126. The upward motion of pins 126 causes arms 124 to rotate in a counterclockwise direction about fixed pins 100. Because of the rotation of arms 124 about fixed pins 100, pins 122 are forced downwardly, and with them arms 120. The downward motion of arms 120 and pins 118 causes arm 96 to rotate in a counterclockwise direction around fixed pins 98. The downward movement of pins 118 and the counterclockwise rotation of arms 96 is against the spring action of springs 156 which act between arms 96 and 106.

Because pins 98 are fixed, the downward motion of pins 88 causes arms 82 to move downwards. As arms 82 move downwards, cam faces 86 coact with cam wheels 56, and the arms 82 are pushed forward to pivot about pins 88 as they move downwards. The fixed spatial relationship between pins 88 and the bottom of cylinder 94 on crossarms 92 causes motion downwards and to the left of the base of the cylinder 94 as viewed in the drawings. Thus, in general, and having particular regard to FIGS. 3 and 4, it can be seen that an upward motion of piston rod 110 causes an upward motion of bead breaker jaw 60; and through the linkage described above, a downward motion of bead breaker jaw 58 is also achieved. It is also seen that, having regard to the drawings, the motion of bead breaker jaw 58 is downwards and to the right and while the motion of bead breaker jaws 60 is upwards and to the right.

Having described in general terms the operation of the bead breaker, the features of the operation of the bead breaker and tire changer are as follows.

A wheel 160 having a tire thereon is placed over the center post 42 so that the lug pin 40 extends through one of the lug holes of the wheel. The lug pin 40 is so mounted as to be pivotal at its bottom end and is generally conical at its upper end, so as to fit and accommodate lug holes in various sizes of wheels in a manner well known in the art. A wheel clamp of the type well known in the art and having a generally inverted, truncated conical configuration is threaded down over the center post 42 by means of partial threads 158 so as to securely hold the wheel against the rim mount 30. The wheel 160 has rims 162 against which the beads are formed by tire 164.

In the usual operation of the machine wherein both the upper and lower bead breaking jaws 58 and 60 will operate simultaneously, the operator, having made sure that lower bead breaker jaw is in its down position as illustrated in the drawings before placing the wheel over center post 42, then swings the upper bead breaker jaw 58 into an operable position. This latter motion is achieved by pulling against the arms 82 or any other fixed member coacting with arms 82 so as to pivot the arms 82 about pins 88, and so that the step engaging member 52 moves along the stepped base 46 until the desired position is achieved. In the event that the arms 82 are swung too far forward, the operator merely lifts handle 54, thereby lifting member 52 off the stepped base 46, and allows the arms 82 to move backwards to the desired position. Springs 166 are mounted on arms 82 and against the rear portion of the frame so as to maintain through their spring action the upper bead breaker jaw 58 in the desired position before operation of the machine. A rim tool 168 is then engaged with the upper rim 162 of wheel 160 in the manner illustrated in FIGS. 3 and 4. It will be noted that rim tool 168 has a projection 169 at its lower extremity which cooperates with the rim of the wheel. Further, the rim tool 168 is slotted and fits over pin 170 between arms 62 and may be moveable up and down thereon by grasping handle 172. When the rim tool 168 is placed, the bead breaker jaw 58 is pivoted slightly in a clockwise direction about pin 74 against the action of spring 76, so that the leading edge of the bead breaker jaw 58 is in contact with the underside of the rim tool 168. The upper bead breaker jaw 58 is, itself, positioned slightly above the upper edge or wall of the tire 164.

A wedge 174 is formed on the upper surface of bead breaker 58, and is so positioned that as the bead breaker jaw moves under rim tool 168, the wedge begins to drive under the rim of the wheel and between the rim and tire so as to assist in the breaking of the bead formed at that rim. Similarly, the bottom bead breaker jaw 60 has guides 173 formed on the underside thereof to guide the leading edge of the jaw over the lower rim 162 of wheel 160 as the leading edge approaches the rim. A wedge may be formed on the underside of the lower bead breaker jaw 60 in the same manner and for the same purpose as the wedge 174 in upper bead breaker jaw 58; and additionally, the leading edge of the camming support member 112 on which lower bead breaker jaw 60 is fixed is so shaped as to create a camming face which coacts with the wheel shoe 38 so as to guide the leading edge of jaw 60 into the proper position between the rim and edge of the tire. Provided that the upper bead breaker jaw 58 is exactly properly placed beforehand, use of the rim tool 168 to guide the jaw 58 into the upper head may be dispensed with.

As pedal 20 of valve 18 is depressed, the bead breaker jaws 58 and 60 move toward the rims 162 of wheel 160 in the manner aforesaid. Also, as noted above, the thrust being generated in the air cylinder 94 is transferred through the lever actuations of the connecting linkage described above so as to be impressed upon the beads at the rims 162 and the edges of tire 164. Continued motion of the bead breaker jaws 58 and 60 is such as to depress the walls of the tire 164, so that at the end of the stroke of piston rod 110 and walls of tire 164 are collapsed in the manner as shown in FIG. 4.

After the beads have been broken as illustrated in FIG. 4, the operator releases pedal 20 of valve 18, thereby relieving air pressure within the air cylinder 94 and at the same time quickly exhausting the air from the cylinder. There being no sustaining pressure maintaining the bead breaker in their broken-bead position, springs 166 and 156 act to restore the machine to its starting position. However, to preclude sudden and swift return of the machine to its starting position, restrictor cylinder 144 is adapted to slowly assume its rest position, and to absorb the energy expended as the mass of the bead breaker as described moves to its rest position. Also, as will appear more evident hereinafter, a slow return of the tire change to its rest position is desirable during tire mounting and demounting operations.

In the event that the operator notices that the beads of tire 164 are not breaking during operation of the machine in the manner described above, he may choose to rest the machine so as to break either the upper or lower bead. In the event that he chooses first to break the lower bead, the operator removes the upper bead breaker jaw 58 from operation by manipulating handle 54 and step engaging member 52 away from stepped base piece 46, so as to swing arms 82 and the associated upper bead breaker 58 rearwards. The forward and rearward movement of the arms 82—in this event far enough rearward that the stepped base plate 46 no longer cooperates with member 52—is accommodated by the movement of tongues 176 in grooves 178 above plates 44 and beneath plates 180, as illustrated in FIG. 1.

The upper bead breaker jaw 58 having been swung out of the way so that it can no longer contact the upper portions of tire 164, the bead breaker is then operable against only the bottom bead of tire 164. As before, the operator presses pedal 20 of valve 18 and piston rod 110 begins its extension from cylinder 94. However, in this case, the thrust being developed in the bead breaker is manifest only at lower bead breaker jaw 60 against the lower bead of tire 64, except for the energy absorbed in moving the mass of the equipment in the manner aforesaid. That is, all of the arms and linkages move as described above, except that upper bead breaker jaw 58 encounters no resistance to its movement, and all of the thrust being developed except the energy to move the linkages resulting in movement of upper bead breaker jaw 58 transfers or appears at lower bead breaker jaw 60. Therefore, the thrust now appearing at lower bead breaker jaw 60 when upper bead breaker jaw 58 is not encountering resistance to its motion is substantially the total thrust which appeared when both bead breaker jaws 58 and 60 were operable.

In like manner, should the operator decide to break the upper bead before the lower bead, he swings bead breaker jaw 60 rearward about pins 114, thereby removing it from a path in which during its motion it would encounter resistance to its movement. Upon operation of the bead breaker in the manner aforesaid, all of the thrust developed is manifest at the upper bead breaker jaw 58, except for the energy expended in moving the linkages etc. as previously noted.

Thus, where it appears difficult to break both beads of the tire simultaneously, the operator can choose to break either the upper or lower bead, and the thrust developed at the bead breaker jaw so as to facilitate the breaking of the bead is substantially the total thrust which would appear if both bead breaker jaws 58 and 60 operated simultaneously. That is the thrust on either of the bead breaker jaws 58 or 60 when operated singly is substantially the entire thrust available as the machine is operated.

Yet another condition of operation of this bead breaker according to this invention is manifest when one or the other of the beads is more easily broken than the other. In that case, the resistance exerted by the beads against the bead breaker jaws 58 and 60 is uneven; the bead being the harder to break exerting the greater resistance. It is a feature of the present bead breaker that the thrust exerted by either of the bead breaker jaws is substantially proportional, with respect to the total amount of thrust available, to the proportional resistance which the jaw encounters with respect to the combined resistance of both beads. This may be expressed as $$\frac{T_1}{T_1 + T_2} \doteq \frac{R_1}{R_1 + R_2}$$

where $T_1$ and $T_2$ are the thrusts exerted by each of the bead breaker jaws respectively; and $R_1$ and $R_2$ are the respective resistances which each of the bead breaker jaws encounters.

Thus, when one of the beads is somewhat harder to break than the other bead, the combined thrust exerted by the bead breaker jaws is distributed between the jaws so that the jaw encountering the greater resistance exerts greater thrust, as is discussed above. In some instances one of the beads may break before the other, and in that event substantially the entire thrust is transferred to the bead breaker operating against the unbroken bead.

When both beads of tire 164 have been broken, the tire will be demounted from the wheel 160 by the operator. To accommodate this operation, the operator will remove both bead breaker jaws 58 and 60 from operative position, in the manner aforesaid with respect to each, and will place over the flattened, reduced upper end 182 of center post 42 a tire demounting tool of the type well known in the art. The tire demounting tool is then rotated so as to demount the tire from the rim by again putting the machine in an operative cycle. In this case, however, both bead breaker jaws 58 and 60 are removed from an operative position, but the center post 42 rotates in the manner illustrated in FIG. 2 due to the operation of rack gear 132 against pinion 134 as described above. It has been previously noted that at the end of the operative motion of the linkages of the tire changer of this invention, the machine restores to its rest position slowly because of the operation of restrictor cylinder 144. Such slow restoration to the rest position is equally important in tire mounting and demounting operations so as to preclude the risk of the tool becoming dislodged from center post 42 as it returns to rest.

In like manner to the tire demounting operation, when a tire is to be mounted on wheel 160 the bead breaker jaws 58 and 60 are swung out of operative position, and the tire placed on the wheel using a tire mounting tool which fits over rotatable center post 42. The tire mounting tool is, again, any tire tool suitable for operation on a rotatable center post as are well known in the art—and in many cases is the opposite end of the same tool which is used for tire demounting. A compressed air hose suitable for inflation of the tire when mounted on the wheel is conveniently located on the tire changer, and may derive its source from the compressed air source of the machine as shown at hose 184 leading off from the compressed air supply 152 before the inlet to valve 18 in FIG. 1.

The above discussion has particularly described a tire changer, and especially the bead breaker portion thereof, which is particularly useful in the automotive trade, and in which either the upper or lower bead breaker jaws may be removed from the operation of the machine so that the other bead breaker exerts substantially the entire thrust than is developed in the machine. The bead breaker develops a proportional thrust against each bead, when both bead breaker jaws are used, relative to the resistance which each of the jaws encounters. Additionally, both bead breaker jaws can be removed from operation so as to permit tire mounting and demounting functions of the machine to proceed. The tire changer as has been described is one which can be controlled by the operator from substantially a single position.

By way of example, tire changers as discussed above have been manufactured which develop approximately 8200 pounds of thrust with 150 p.s.i. line pressure (less friction); thereby delivering approximately 4100 pounds thrust to each bead breaker jaw when used simultaneously and when the beads are of substantially equal resistance or substantially 8200 pounds thrust to either bead breaker jaw when used singly. The bead breaker may be used on tires of various sizes as may be found in the automotive trade, on tires having various wall-ply thicknesses and ratings, and on tubeless or on tube-type tires.

By the installation of suitable restraining springs, the use of restrictor 144 may be precluded. However, in the preferred embodiment of the tire changer according to this invention, the restrictor cylinder is installed as has been described. Further, other means may be provided for providing the motive force by which movement in the machine is achieved, such as a suitably geared electric motor and an extensible rack gear or other means.

The machine as described above with respect to the drawings is one in which the frame and all of the thrust transfer mechanism is two sided; that is, there may be said to be a left- and a right-hand side. Each of the arms etc. is therefore duplicated, one on each side, and the arms move in concert, and are connected horizontally by various pins and crossmembers as described. However, it is clear that a single handed machine could be arranged; that is, a machine in which only one of each of the arms etc. appears. The operation of such a machine would be exactly as described above except for minor design details of linkages.

While a preferred embodiment of the bead breaker and tire changer according to this invention have been described in detail, certain structural modifications and details may be altered without departing from the spirit or scope of the appended claims.

I claim:

1. In a bead breaker for a tire changer: p1 a pair of bead breaking jaws;
    means for moving said jaws towards each other to compress a tire mounted on a wheel to break the beads formed between said tire and said wheel with a predetermined thrust;
    said means for moving said jaws being operable so as to distribute said predetermined thrust between said pair of jaws so that the combined thrust exerted by said jaws against said beads is substantially said predetermined thrust, and so that the thrust exerted by either of said jaws is substantially proportional to said predetermined thrust as the resistance against said jaw is proportional to the combined resistance against both jaws.

2. The combination according to claim 1 wherein either of said bead breaking jaws may be moved out of tire bead engaging relation so that the thrust exerted by the other of said bead breaking jaws is substantially said predetermined thrust.

3. The combination according to claim 1 wherein the motion of said pair of bead breaking jaws towards each other is such that each of the jaws moves along a converging locus in a direction towards the center of said wheel.

4. The combination according to claim 1 including a frame, and wherein said means for moving said jaws towards each other comprises:
    First, second and third pivot points on said frame;
    Said first pivot point being nearer the front of said frame and higher than said second and third pivot points;
    Said second pivot point being rearward and lower than said first pivot point, and said third pivot point being forward and lower than said second pivot point;
    First arm means attached at a first end to said first pivot point;
    Second arm means pivotably mounted about said second pivot point;
    First connecting arm means between an intermediate position along the length of said first arm means and a first end of said second arm means.
    Third arm means attached at a first end thereof to said third pivot point;
    Second connecting arm means connecting the second end of said second arm means and an intermediate position of said third arm means;
    Extensible motive power means between the second end of each of said first and third arm means and adapted so as to linearly increase or decrease the separation between said second ends of said first and third arm means;
    Fourth arm means extending upwardly from, and pivotally related to, the bottom of said extensible motive power means;
    A camming surface cooperating with said fourth arm means and cam means so as to induce forward motion in said fourth arm means as said fourth arm means moves downwards;
    A first bead breaker jaw pivotally related to said fourth arm means, and a second bead breaker jaw pivotally related to an intermediate position of said first arm means closer to said end thereof than said intermedial position on said first arm means to which said first connecting arm means is connected;
    And means to initiate and stop the operation of said extensible motive power means.

5. The combination according to claim 4 herein each of said first and second bead breaker jaws has at least a single wedge formed in the surface thereof which is intended to move between a rim of said wheel and the elated edge of said tire mounted thereon.

6. The combination according to claim 5 further comprising means slidably engaged with said first bead breaker jaw for engaging a first rim of said wheel.

7. The combination according to claim 6 further comprising means at the rear of and swingably attached to said fourth arm means to cooperate therewith so as to provide forward and rearward adjustment of the rest position thereof.

8. A tire changer including the combination according to claim 7 and further comprising:
    Wheel mount means and a rotatable center post extending above said wheel mount means;
    And means for rotating said rotatable center post during operation of said extensible motive power means.

9. The combination according to claim 7 including means for damping the motion of said first, second, third and fourth arm means, said first and second connecting arm means, and said first and second bead breaker jaws as they move to their rest positions upon cessation of operation of said extensible motive power means.